US012500999B2

(12) United States Patent
Davidson

(10) Patent No.: US 12,500,999 B2
(45) Date of Patent: Dec. 16, 2025

(54) DETAILED VIDEOCONFERENCE VIEWPOINT GENERATION

(71) Applicant: eBay Inc., San Jose, CA (US)

(72) Inventor: Justin Donald Davidson, San Jose, CA (US)

(73) Assignee: eBay Inc., San Jose, CA (US)

( * ) Notice: Subject to any disclaimer, the term of this patent is extended or adjusted under 35 U.S.C. 154(b) by 239 days.

(21) Appl. No.: 18/357,895

(22) Filed: Jul. 24, 2023

(65) Prior Publication Data

US 2023/0362332 A1 Nov. 9, 2023

Related U.S. Application Data

(63) Continuation of application No. 17/579,098, filed on Jan. 19, 2022, now Pat. No. 11,743,428.

(51) Int. Cl.
| | |
|---|---|
| *H04N 7/15* | (2006.01) |
| *G01S 15/06* | (2006.01) |
| *G06T 7/20* | (2017.01) |
| *G06V 40/16* | (2022.01) |
| *G10L 25/78* | (2013.01) |
| *H04L 12/18* | (2006.01) |

(52) U.S. Cl.
CPC ............ *H04N 7/15* (2013.01); *G01S 15/06* (2013.01); *G06T 7/20* (2013.01); *G06V 40/172* (2022.01); *G10L 25/78* (2013.01); *H04L 12/1822* (2013.01)

(58) Field of Classification Search
CPC .... H04N 7/15; H04L 12/1822; G06V 40/172; G01S 15/06; G06T 7/20; G10L 25/78
USPC ...................................................... 348/14.08
See application file for complete search history.

(56) References Cited

U.S. PATENT DOCUMENTS

| | | |
|---|---|---|
| 7,113,201 B1 | 9/2006 | Taylor et al. |
| 9,942,518 B1 * | 4/2018 | Tangeland ........... G06V 10/763 |

(Continued)

FOREIGN PATENT DOCUMENTS

| | | |
|---|---|---|
| EP | 3951715 A1 | 2/2022 |
| KR | 101680524 B1 | 11/2016 |
| WO | 2022115803 A1 | 6/2022 |

OTHER PUBLICATIONS

U.S. Appl. No. 17/579,098, "Non-Final Office Action", U.S. Appl. No. 17/579,098, Mar. 3, 2023, 18 pages.

(Continued)

*Primary Examiner* — Binh Kien Tieu
(74) *Attorney, Agent, or Firm* — FIG. 1 Patents

(57) ABSTRACT

A videoconference system is described that generates a video for a room including multiple videoconference participants and outputs the video as part of the videoconference. The videoconference system is configured to generate the video as including a detailed view of one of the multiple videoconference participants located in the room. To do so, the videoconference system detects user devices located in the room capable of capturing video and determines a position of each user device. The videoconference system then detects a user speaking in the room and determines a position of the active speaker. At least one of the user devices is identified as including a camera oriented for capturing the active speaker. Video content captured by one or more user devices is then processed by the videoconference system to generate a detailed view of the active speaker.

20 Claims, 12 Drawing Sheets

(56) References Cited

U.S. PATENT DOCUMENTS

| | | | |
|---|---|---|---|
| 10,027,926 B1* | 7/2018 | Schirdewahn | H04W 4/02 |
| 11,743,428 B2* | 8/2023 | Davidson | H04N 7/147 |
| | | | 348/14.08 |
| 2008/0279421 A1* | 11/2008 | Hamza | G06T 7/70 |
| | | | 382/103 |
| 2018/0376108 A1 | 12/2018 | Bright-Thomas et al. | |
| 2020/0260049 A1* | 8/2020 | Erna | H04N 7/147 |
| 2021/0174791 A1* | 6/2021 | Shen | G06N 3/04 |
| 2022/0132090 A1* | 4/2022 | Deole | H04N 19/167 |
| 2022/0237735 A1* | 7/2022 | Zingade | G06V 20/40 |
| 2022/0295011 A1* | 9/2022 | Peng | G06F 18/22 |
| 2023/0231971 A1 | 7/2023 | Davidson | |

OTHER PUBLICATIONS

U.S. Appl. No. 17/579,098, "Notice of Allowance", U.S. Appl. No. 17/579,098, Jun. 1, 2023, 6 pages.

* cited by examiner

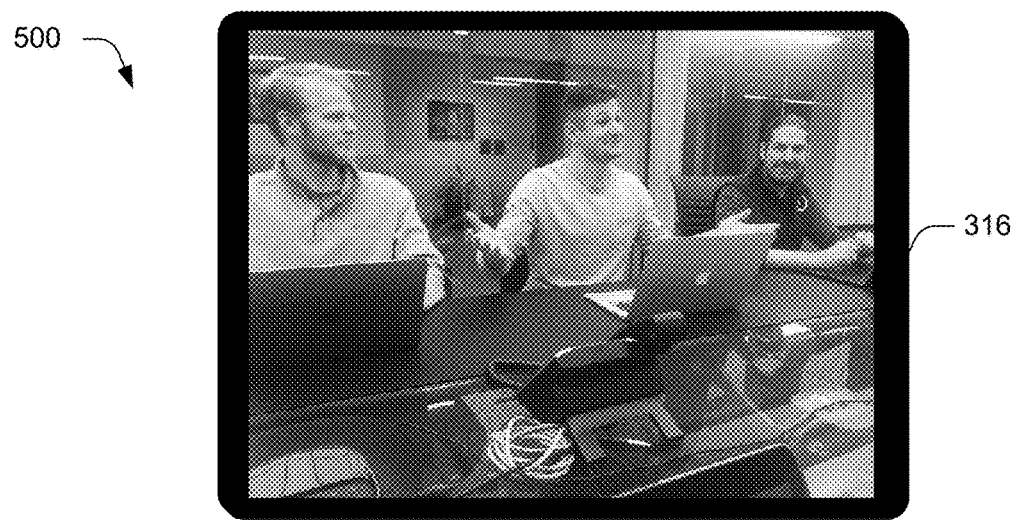
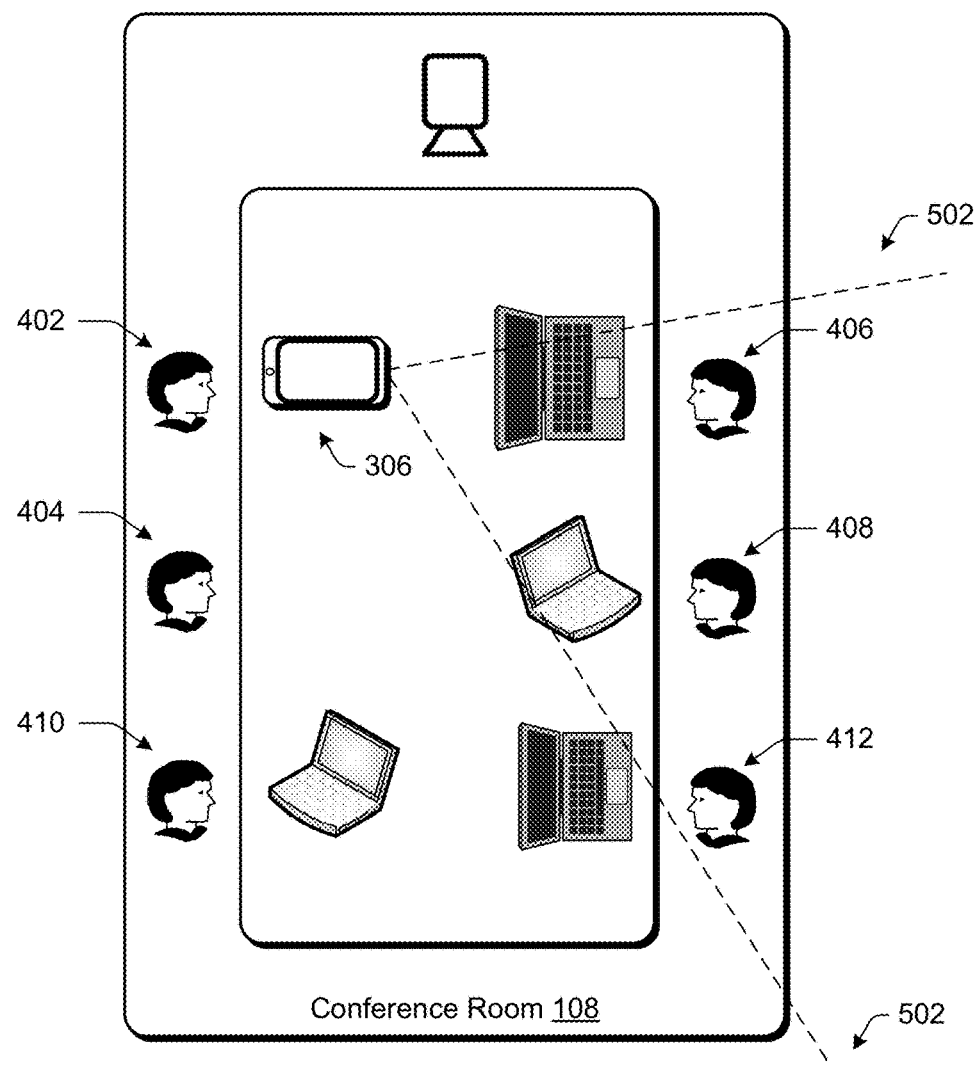
Fig. 5

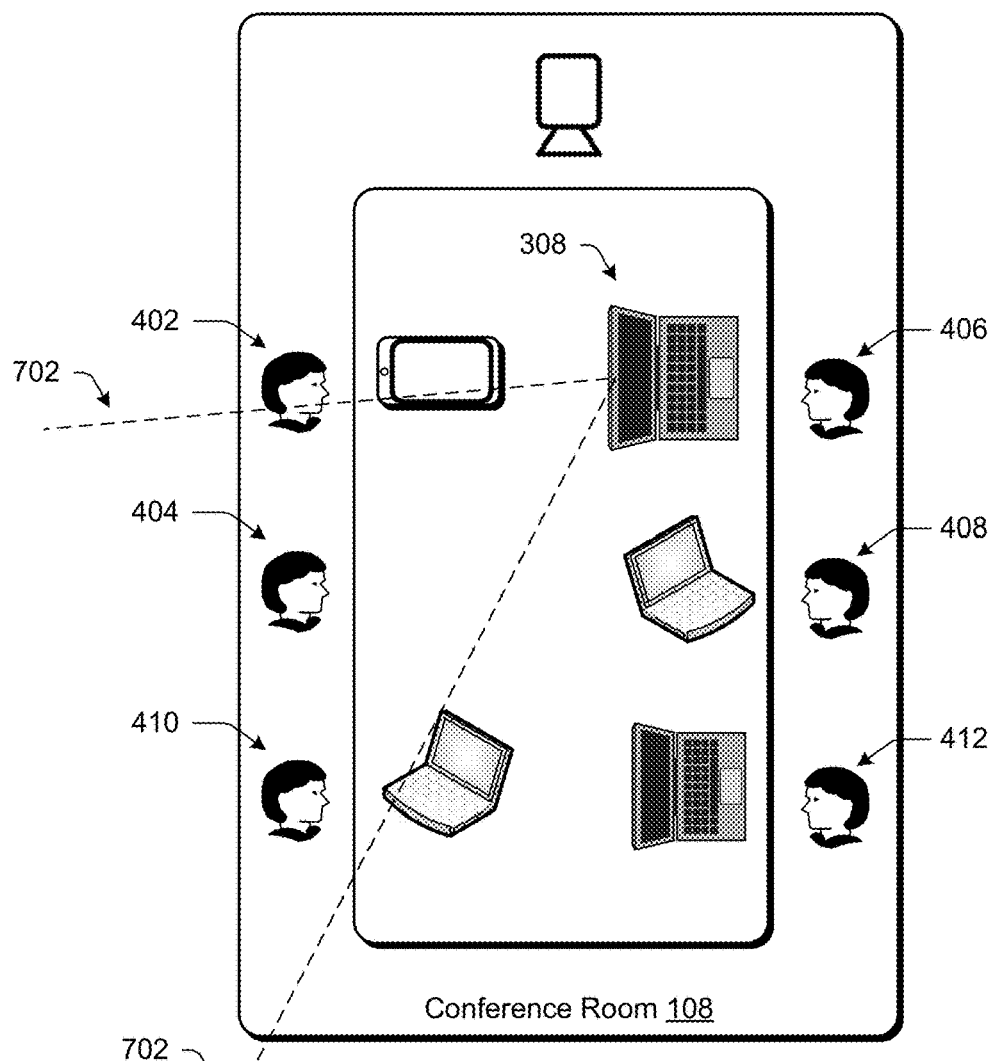
Fig. 7

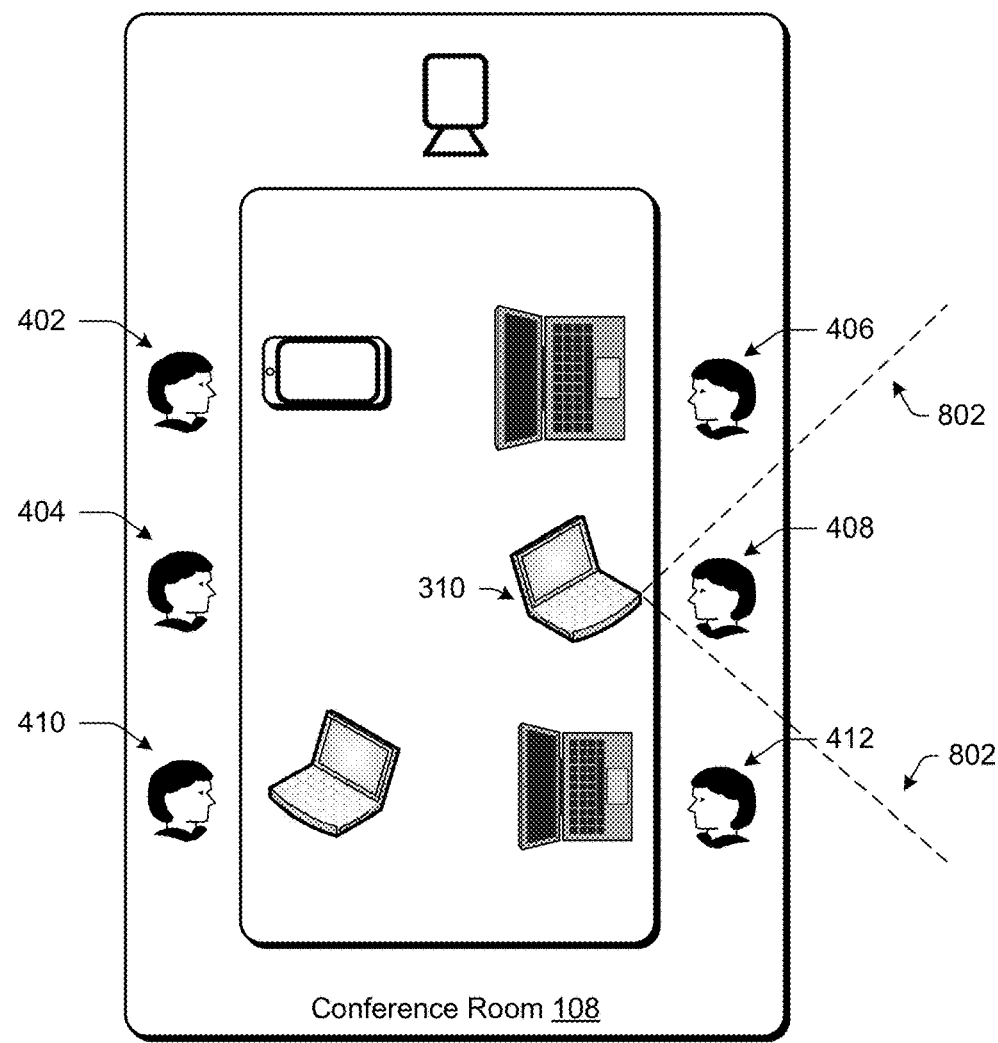
Fig. 8

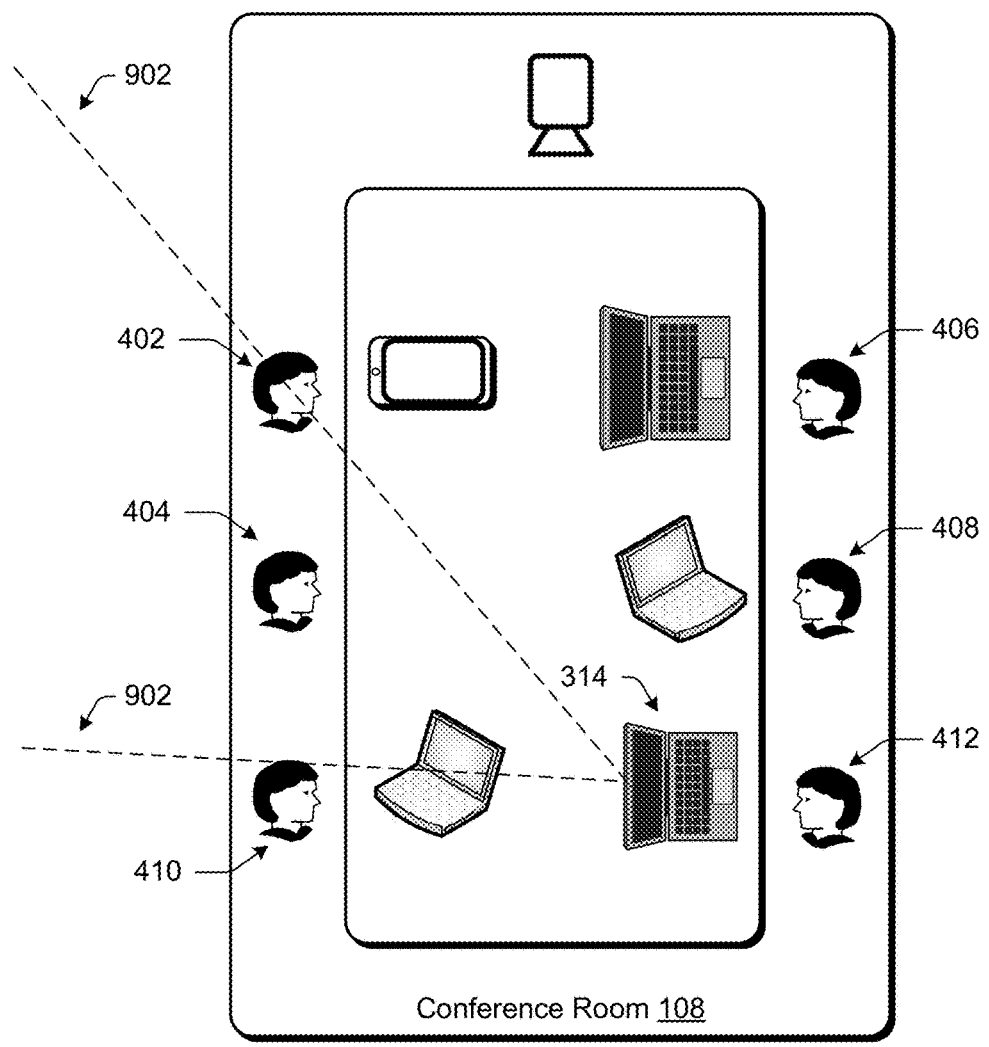
Fig. 9

DETAILED VIDEOCONFERENCE VIEWPOINT GENERATION

RELATED APPLICATIONS

This application is a continuation of and claims priority to U.S. patent application Ser. No. 17/579,098, filed Jan. 19, 2022, entitled "Detailed Videoconference Viewpoint Generation," the disclosure of which is hereby incorporated by reference in its entirety.

BACKGROUND

Videoconferences are used to transmit audio and video signals among users in different locations in a manner that enables real-time communication. In many instances multiple users gather in a single location, such as a conference room, to participate in a videoconference. By congregating multiple users in a single location, the multiple users can join the videoconference via a single video stream, which reduces a number of video streams output during the videoconference. Conventional conference rooms, however, are often equipped with only a single camera, which provides a viewpoint designed to capture all users in the conference room rather than detailed viewpoints of individual users in the conference room. Consequently, videoconference participants that are not physically located in the conference room are limited in their ability to perceive important details that are otherwise observable by participants in the conference room, such as body language and facial expressions of an active speaker.

SUMMARY

A videoconference system is described that generates a video for a room including multiple videoconference participants and outputs the video as part of the videoconference. The videoconference system is configured to generate the video as including a detailed view of one of the multiple videoconference participants located in the room. To do so, the videoconference system detects user devices located in the room capable of capturing video. Detected devices that opt into the videoconference are then caused to capture video and transmit the captured video to the videoconference system. The videoconference system determines a position of each device in the room that opts into the videoconference.

The videoconference system then detects a user speaking in the room and determines a position of the active speaker. Respective positions of the opted-in devices and active speaker(s) within the room are determined using video captured by a camera disposed in the room, audio captured by a microphone disposed in the room, video captured by one or more of the detected user devices, audio captured by one or more of the detected user devices, or combinations thereof. At least one of the user devices are then identified as including a camera oriented for capturing video content that includes the position of the active speaker. Video content captured by user devices that include the position of the active speaker is then processed by the videoconference system to generate a detailed view of the active speaker. The detailed view of the active speaker is then output as part of the videoconference, such that videoconference participants located remotely from the room are provided with the detailed view of the active speaker.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In some implementations, entities represented in the figures are indicative of one or more entities and thus reference is made interchangeably to single or plural forms of the entities in the discussion.

FIGS. 5-9 depict example implementations showing viewpoints captured by user devices disposed in a meeting room.

DETAILED DESCRIPTION

Overview

Figure 1:
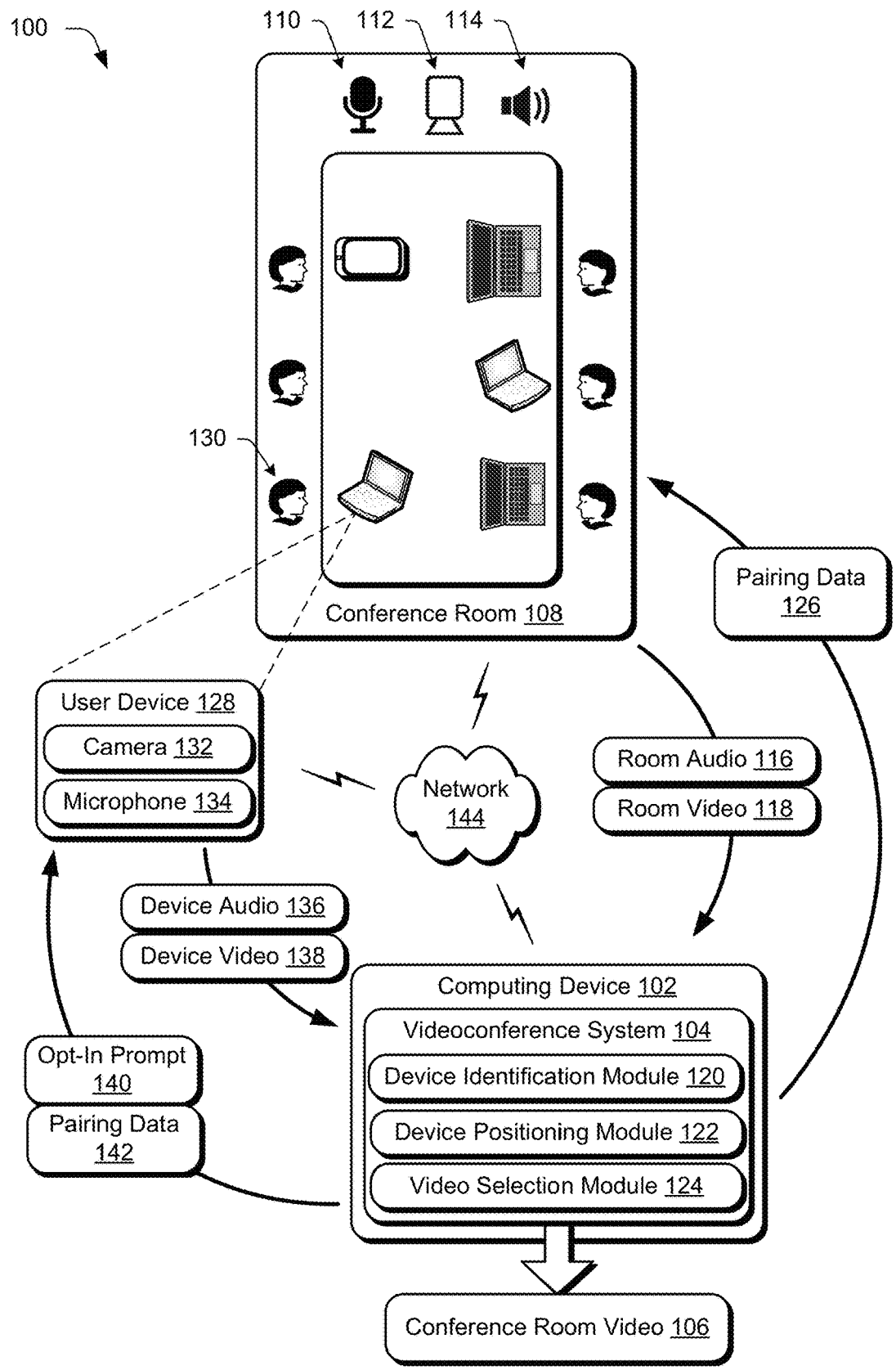
FIG. 1 is an illustration of an environment in an example implementation that is operable to employ a videoconference system to generate personalized viewpoints of meeting participants in a room.

With advances in computing device technology, diverse types of computing devices are designed with at least one integrated camera. For instance, phones, laptops, tablets, wearable devices such as glasses and watches, and so forth commonly support cameras with sophisticated lenses and image capture functionality. Due to their portable nature, many of these personal devices often accompany users into a conference room when users participate in a videoconference, but are not themselves used for participating in the videoconference. Rather, personal devices are used to send emails, take notes, and perform other incidental tasks while dedicated conference room equipment (e.g., a conference room camera, speaker, microphone, and display) are used by multiple users in the conference room for participating in the videoconference.

While this dedicated conference room equipment is generally optimized to acoustically capture active speakers located in the conference room, conventional conference rooms are often equipped with limited cameras (e.g., a single camera) having viewpoints designed to capture a majority of the conference room as opposed to detailed viewpoints of individual users in the conference room. Consequently, videoconference participants that are not physically located in the conference room are limited in their ability to perceive important details that are otherwise observable by participants in the conference room, such as body language and facial expressions of an active speaker.

This limited display of active speaker details in a conference room is exacerbated for larger conference rooms as well as in scenarios where additional participants join a videoconference from a single conference room. To address these shortcomings, some conventional approaches rely on a human camera operator to manually adjust a viewpoint and focus a conference room camera on a position of an active speaker during the videoconference. However, such approaches require cameras configured with movement controls as well as the significant manual effort of actively adjusting a camera to capture active speakers, which is intractable for many conference room configurations.

To address these issues, techniques for generating a conference room video that includes a detailed viewpoint depicting an active speaker located in the conference room are described. A videoconference system detects one or more user devices that are located in the room and capable of capturing video content but not currently participating in a videoconference. The videoconference system automatically initiates a connection with each detected user device, causes the user device to capture audio and video within the conference room, and instructs the user device to transmit the captured audio and video to the videoconference system for use in generating the conference room video.

In order to generate the detailed viewpoint that depicts the active speaker, the videoconference system is configured to determine respective positions for each user device that is detected in the conference room. Upon detecting an active speaker in the conference room, the videoconference system is configured to determine a location of the active speaker leveraging the positions determined for each user device. The videoconference system is configured to determine positions for each user device as well as the active speaker using audio and video captured by dedicated conference room devices as well as audio and video captured by individual ones of the user devices located within the conference room. Devices that include the position of the active speaker within their respective field of view are then identified as candidates for capturing video content to be used in generating the detailed view of the active speaker for output as part of the videoconference.

Advantageously relative to conventional approaches, the videoconference system is configured to generate the conference room video automatically and independent of user input. The conference room video output by the videoconference system thus provides videoconference participants not physically located in the conference room with an improved viewpoint depicting details of an active speaker that are otherwise only perceptible by videoconference participants located in the conference room, thus enhancing an overall experience for videoconference participants relative to conventional videoconference systems. Further discussion of these and other examples is included in the following sections and shown in corresponding figures.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet or mobile phone), and so forth. Thus, the computing device 102 ranges from full resource devices with substantial memory and processor resources (e.g., personal computers, game consoles) to low-resource devices with limited memory and/or processing resources (e.g., mobile devices). Additionally, although described in the context of a single computing device 102, the computing device 102 is representative of a plurality of different devices, such as multiple servers utilized to perform operations "over the cloud."

In the illustrated example, the computing device 102 includes a videoconference system 104. The videoconference system 104 is representative of functionality of the computing device 102 to generate a conference room video 106 that depicts a personalized viewpoint depicting at least one active speaker participating in a videoconference via a conference room 108. The conference room 108 is depicted as including a microphone 110, a camera 112, and a speaker 114. The microphone 110, the camera 112, and the speaker 114 each represent dedicated hardware devices of the conference room 108 that are configured to enable participation in a videoconference for occupants of the conference room 108. For instance, the microphone 110 is configured to capture audio in the conference room 108 and transmit the captured audio to at least one videoconference participant located remotely from the conference room 108. Audio captured by the microphone 110 is represented as room audio 116. In a similar manner, the camera 112 is configured to capture video data of the conference room 108 and transmit the captured image data to at least one videoconference participant located remotely from the conference room 108. Video data captured by the camera 112 is represented as room video 118. Notably, the camera 112 is representative of a fixture of the conference room 108; configured to remain in a fixed position during a duration of a videoconference.

The speaker 114 is configured to output audio for the videoconference, such as audio of one or more participants located remotely from the conference room 108. In some implementations, the conference room 108 includes a display device (not depicted) that is configured to output image data for the videoconference, such as video data depicting one or more participants of the videoconference located remotely from the conference room 108. In some implementations, the microphone 110, the camera 112, and the speaker 114 are integrated into a single device. Alternatively, the microphone 110, the camera 112, and the speaker 114 are implemented in the conference room 108 via multiple different devices. Although depicted as including only a single microphone 110, a single camera 112, and a single speaker 114 in the illustrated example of FIG. 1, the conference room 108 is configured to include any number of microphones 110, any number of cameras 112, and any number of speakers 114 in accordance with the implementations described herein.

As described above, the room video 118 captured by the camera 112 often provides a viewpoint of the conference room 108 that fails to capture a detailed view of active speakers located within the conference room 108. This failure to capture a detailed active speaker viewpoint often creates a degraded experience for videoconference participants not located in the conference room 108. To address these conventional shortcomings, the videoconference system 104 generates the conference room video 106 that includes a detailed view of an active speaker for output as part of the videoconference (e.g., by supplementing or replacing the room video 118). To generate the conference room video 106, the videoconference system 104 implements a device identification module 120, a device positioning module 122, and a video selection module 124.

The device identification module 120 is representative of functionality of the videoconference system 104 to identify at least one user device disposed in the conference room 108 that is capable of capturing video data. In contrast to the camera 112, user devices identified or detected by device identification module 120 refer to devices that are not fixtures in the conference room 108 or otherwise dedicated for capturing video of the conference room 108. To identify at least one user device disposed in the conference room 108 capable of capturing video, the device identification module 120 is configured to transmit pairing data 126 to the conference room 108 for output via the speaker 114.

In some implementations, the pairing data 126 causes a dedicated device of the conference room 108 to output a signal that, when detected by a user device, causes the user device to connect with the videoconference system 104. The illustrated example of FIG. 1 depicts multiple user devices and multiple users located in the conference room 108, such as user device 128 with user 130. Although depicted as laptops and a phone in the illustrated example of FIG. 1, reference to the user device 128 is not limited to a laptop or phone. Rather, the user device 128 is representative of any suitable device type (e.g., laptop, tablet, phablet, smartphone, wearable, or other mobile device) and is not limited with respect to device operating parameters (e.g., operating system, network connection type, supported web browser or application types, etc.). The user device 128 is representative of a device that includes a camera 132 capable of capturing video content and optionally a microphone 134 capable of capturing audio content.

The videoconference system 104 is configured to cause output of the pairing data 126 to detect one or more user devices 128 located in the conference room 108. For instance, in some implementations the pairing data 126 is representative of audio-encoded data configured for output by the speaker 114 that, when detected by the microphone 134 of the user device 128, causes the user device 128 to establish a connection with the videoconference system 104. In some implementations, the audio-encoded data is a tone, chime, pattern, or the like that is audible to the human ear, such that the audio-encoded pairing data 126 is perceptible to the user 130. Alternatively or additionally, the audio-encoded pairing data 126 is a frequency output by the speaker 114 that is capable of being detected by the microphone 134 and imperceptible to the user 130, such as an ultrasonic frequency, an infrasonic frequency, and so forth.

Alternatively or additionally, the pairing data 126 is representative of visual data configured for output by a display device in the conference room 108 (e.g., a QR code or other machine-readable optical identifier) that, when captured by the camera 132 of the user device 128, causes the user device 128 to establish a connection with the videoconference system 104. Alternatively or additionally, the pairing data 126 is representative of a signal configured to be output by one or more of the microphone 110, the camera 112, the speaker 114, a display device, or other component of the conference room 108 that, upon detection by the user device 128, causes the user device 128 to establish a connection with the videoconference system 104. Examples of signals encoded in the pairing data 126 include Bluetooth signals, Wi-Fi signals, Near Field Communication (NFC) signals, and so forth.

Upon establishing a connection with the videoconference system 104, the user device 128 transmits device audio 136 and device video 138 to the videoconference system 104. The device audio 136 is representative of data captured by the microphone 134 and the device video 138 is representative of data captured by the camera 132 of the user device 128. In some implementations, the user device 128 is prevented from transmitting the device audio 136 and the device video 138 to the videoconference system 104 without consent from a user of the user device 128, such as user 130.

To obtain user consent, in response to connecting with the user device 128 (e.g., triggered via the user device 128 detecting the pairing data 126), the videoconference system 104 transmits an opt-in prompt 140 to the user device 128. The opt-in prompt 140 is representative of a request for consent output at a display of the user device 128 to transmit device audio 136 and/or device video 138 to the videoconference system 104 for use in generating the conference room video 106. In response to receiving consent from a user of the user device 128 (e.g., via input to a control of the prompt 140 indicating agreement to share the device audio 136 and/or the device video 138 with the videoconference system 104), the user device 128 transmits the device audio 136 and/or the device video 138 to the videoconference system 104.

In some implementations, after establishing a connection with the user device 128 and receiving consent from a user of the user device 128 to participate in generating the conference room video 106, the videoconference system 104 transmits pairing data 142 to the user device 128. The pairing data 142 is representative of information that instructs the user device 128 how to communicate the device audio 136 and/or the device video 138 to the computing device 102 implementing the videoconference system 104, such as via network 144.

In some implementations, the pairing data 142 includes the pairing data 126, and the videoconference system 104 uses the user device 128 to detect additional user devices located in the conference room 108. For instance, in an example implementation where the pairing data 126 causes output of an ultrasonic frequency, the videoconference system 104 causes the user device 128 to output the ultrasonic frequency by transmitting the pairing data 142 to the user device 128. In such an example, output of the ultrasonic frequency by the user device 128 is detected by an additional user device within the conference room 108, which in turn establishes a connection with the videoconference system 104 and transmits additional device audio and/or device video for use by the videoconference system 104 in generating the conference room video 106, as described in further detail below.

As described herein, the room audio 116, the room video 118, the pairing data 126, the device audio 136, the device video 138, the prompt 140, and the pairing data 142 are configured to be transmitted between the videoconference system 104 and the conference room 108 or the user device 128 via a network, such as network 144. The network 144 is thus representative of any suitable communication architecture configured to connect the computing device 102 to one or more devices of the conference room 108 (e.g., the microphone 110, the camera 112, or the speaker 114) and one or more user devices such as user device 128. For instance, the network 144 is representative of a local area network, a wide area network, and so forth.

The device positioning module 122 is representative of functionality of the videoconference system 104 to determine a position, for each user device 128 detected by the device identification module 120, of the user device within the conference room 108. The device positioning module 122 is configured to determine a position for each user device 128 detected in the conference room 108 using the room audio 116, the room video 118, the device audio 136, the device video 138, or combinations thereof.

The video selection module 124 is representative of functionality of the videoconference system 104 to detect an active speaker within the conference room 108 and generate a detailed view of the active speaker for output as the conference room video 106. To do so, the video selection module 124 is configured to ascertain a position of the active speaker within the conference room 108, using one or more of the room audio 116, the room video 118, the device audio 136, or the device video 138. Based on the position of the active speaker, the video selection module 124 selects video data from one of the cameras in the conference room, such as from dedicated camera 112 or from a camera 132 of a user device 128, that best captures a detailed view of the active speaker. The video selection module 124 then optionally processes the selected video data to create a detailed viewpoint that depicts the active speaker and outputs the detailed viewpoint as the conference room video 106. Although illustrated in FIG. 1 as being implemented by computing device 102, the videoconference system 104 is alternatively or additionally implemented by one or more client devices participating in a videoconference, such as user device 128. For additional details describing functionality of the videoconference system 104, consider the following description.

In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are configured to be applied together and/or combined in different ways. Thus, individual functionality, features, and concepts described in relation to different example environments, devices, components, figures, and procedures herein are useable in any suitable combinations and are not limited to the combinations represented by the enumerated examples in this description.

Personalized Videoconference Viewpoint Generation

Figure 2:
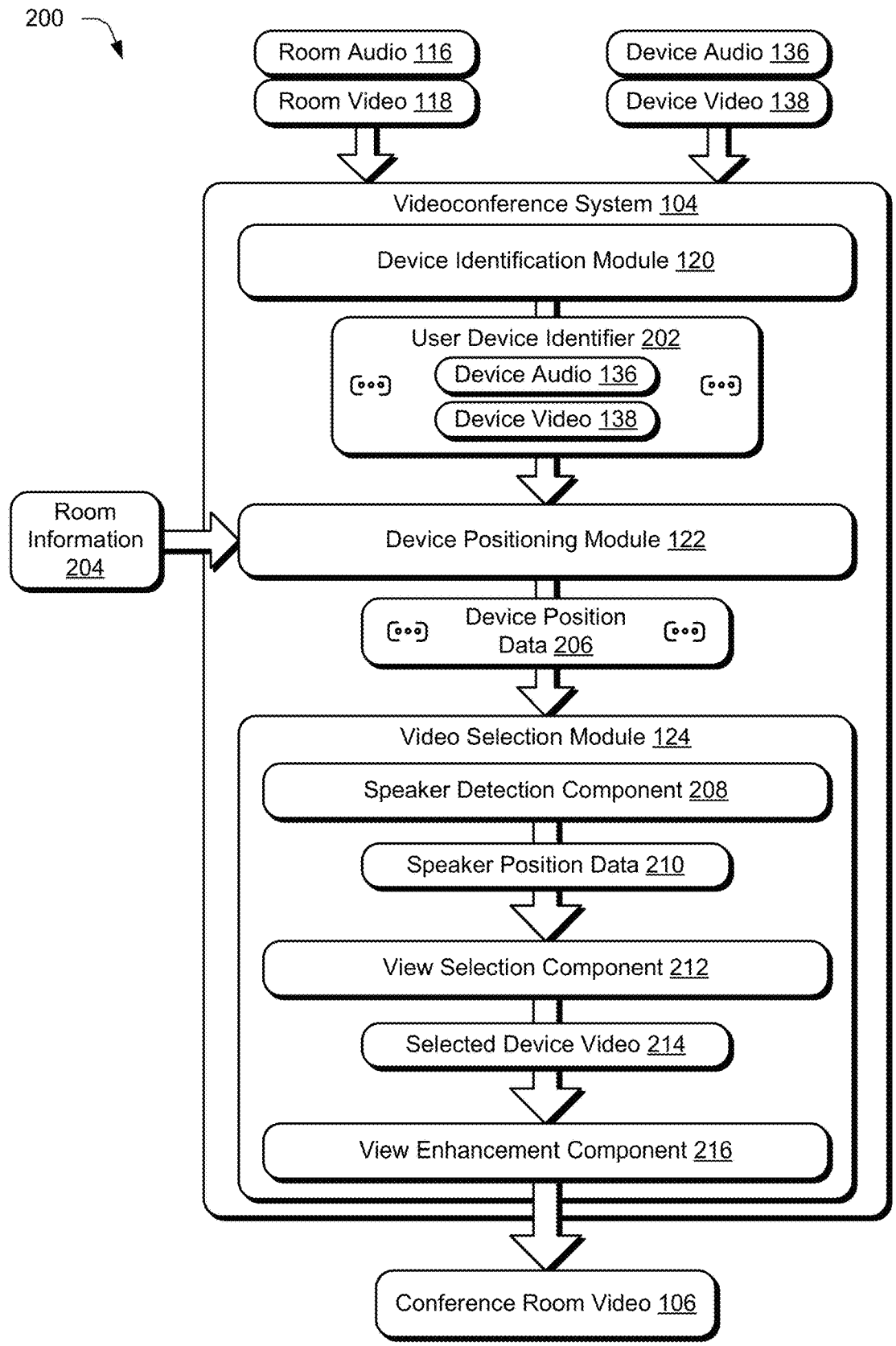
FIG. 2 depicts a system in an example implementation showing operation of the videoconference system of FIG. 1 in greater detail.

FIG. 2 is an illustration of a digital medium environment 200 in an example implementation of the videoconference system 104 generating a conference room video 106 that depicts a detailed view of at least one videoconference participant located in a conference room 108.

In the illustrated example, the videoconference system 104 receives room audio 116 and room video 118 from dedicated devices of a room participating in a videoconference, such as the conference room 108 illustrated in FIG. 1. The videoconference system 104 additionally receives device audio 136 and device video 138 from at least one user device located in the room, such as the user device 128 illustrated in FIG. 1. Although illustrated in FIG. 1 as being received from only a single user device, the videoconference system 104 is configured to receive device audio 136 and device video 138 from any number of user devices located in the room, in accordance with the techniques described herein.

In some implementations, the room audio 116, the room video 118, the device audio 136, and the device video 138 are each received as streaming data during the duration of a videoconference. In such a streaming implementation, the videoconference system 104 constantly receives one or more of the room audio 116, the room video 118, the device audio 136, or the device video 138 from a respective device (e.g., the microphone 110, the camera 112, or the user device 128) after pairing with the device until termination of the videoconference or otherwise disconnecting from the device. Alternatively or additionally, the room audio 116, the room video 118, the device audio 136, and the device video 138 are received on-demand, such as in response to a request from the videoconference system 104 for the device (e.g., the microphone 110, the camera 112, or the user device 128) to transmit one or more of the room audio 116, the room video 118, the device audio 136, or the device video 138.

After establishing a connection with a user device located in the conference room 108, the device identification module 120 generates a user device identifier 202 for the user device. The device identification module 120 then associates the device audio 136 and the device video 138 received from a user device with the corresponding user device identifier 202 for the user device. The device identification module 120 is configured to perform this process for each user device detected in the conference room 108, such that the videoconference system 104 is supplied with information identifying a particular device from which device audio 136 and/or device video 138 is received. Once associated with a respective user device identifier 202, the device audio 136 and the device video 138 are transmitted from the device identification module 120 to the device positioning module 122.

The device positioning module 122 is configured to obtain room information 204, which describes a layout of the room from which the room audio 116 and the room video 118 are received, such as a layout of the conference room 108 of FIG. 1. The room information 204 is representative of any suitable information describing physical parameters and characteristics of the conference room 108. For instance, in some implementations the room information 204 includes a two-dimensional representation (e.g., a floor plan) of the conference room 108, with information specifying dimensions of the room, positions of furniture in the room (e.g., chairs, tables, etc.), positions of fixtures in the room (e.g., the microphone 110, the camera 112, the speaker 114, lights, columns, doors, windows, etc.).

Alternatively or additionally, the room information 204 includes a three-dimensional representation of the conference room 108. In implementations where the room information 204 includes a three-dimensional representation of the conference room 108, the room information 204 includes data obtained from a scanner (e.g., a lidar scanner) disposed within the conference room 108 that generates a point cloud of surfaces within the conference room 108. Alternatively or additionally, the three-dimensional representation of the room included in the room information 204 is generated by combining image data of an interior of the conference room 108 using photogrammetry. In some instances where the room information 204 specifies a three-dimensional representation of the room, in addition to including dimensional information for the room, the three-dimensional representation includes visual data describing aspects of the room such as surface textures, wall art, and so forth.

Given the room information 204, the device positioning module 122 is configured to determine device position data 206, which is representative of information specifying a position of one or more of the user devices 128 within the device position data 206. The device positioning module 122 is configured to determine device position data 206 for each user device 128 detected in the conference room 108 using one or more of the room audio 116, the room video 118, the device audio 136, the device video 138, and the room information 204.

In some implementations, the device positioning module 122 determines device position data 206 by transmitting instructions via at least one of the pairing data 126 or the pairing data 142 that causes output of an audio signal via the speaker 114 or a speaker of the user device 128. In some implementations, this audio signal is an ultrasonic audio signal that is unique (e.g., specific to the device outputting the audio signal and different from audio signals output by different computing devices) or audibly distinct from the ultrasonic audio signal used to initially pair the user device 128 with the videoconference system 104. The audio signal output by the user device 128 for use in determining device position data 206 is captured by the microphone 110 of the conference room 108, as well as by the microphones 134 of other user devices 128 in the conference room 108. Consequently, this audio signal is captured and transmitted to the videoconference system 104 via the device audio 136 for the respective user devices 128 as well as via the room audio 116.

The device positioning module 122 is configured to analyze the respective streams of room audio 116 and device audio 136 to determine a respective direction and distance of the transmitting user device 128 to respective user devices in the conference room 108 that capture the audio signal. In some implementations, this triangulation is performed by processing the device audio 136 using a time difference of arrival (TDOA) method. Alternatively or additionally, the device positioning module 122 determines device position data 206 by processing the device audio 136 and/or the room audio 116 using a steered response power (SRP) method.

Alternatively or additionally, the device positioning module 122 is configured to determine the device position data 206 for one or more user devices 128 using proximity communications among the user devices 128 and/or devices in the conference room 108. For instance, the device positioning module 122 is configured transmit instructions via at least one of the pairing data 126 or the pairing data 142 that causes a respective device (e.g., the user device 128, the microphone 110, the camera 112, or the speaker 114) to output a signal (e.g., Bluetooth, Wi-Fi, NFC, etc.) that represents the device as a beacon detectable by other ones of the devices in the conference room 108.

In such an implementation, the device positioning module 122 is configured to include instructions in the pairing data 126 or the pairing data 142 that causes each device to broadcast a beacon signal, detect other beacon signals being broadcast based on the instructions, estimate a distance from the device to each beacon signal, and transmit data to the videoconference system 104 indicating the estimated distance from the device to each other device detected as broadcasting a beacon signal. Based on the responses, the device positioning module 122 is configured to triangulate respective positions of the user devices 128 relative to the conference room 108. Alternatively or additionally, the device positioning module 122 is configured to include instructions in the pairing data 126 that causes each user device 128 to transmit geolocation information for the user device 128 (e.g., GPS positioning, cellular positioning, Wi-Fi positioning, or other positioning data) to the videoconference system 104, which is used by the device positioning module 122 to generate the device position data 206 for each user device 128.

Alternatively or additionally, the device positioning module 122 is configured to determine the device position data 206 for one or more user devices 128 using visual data captured by the camera 112, one or more of the user devices 128, or combinations thereof. For instance, in implementations where the room information 204 includes a visual representation of the conference room 108, the device positioning module 122 is configured to analyze the device video 138 received from each user device 128 and determine a position of the user device 128 in the conference room 108 using visual object recognition.

For instance, the device positioning module 122 implements a machine learning model that is trained to identify common objects depicted in different image data (e.g., different images, different video frames, etc.). In response to detecting an object in device video 138 captured by a user device 128 that is also depicted in the room information 204, the device positioning module 122 approximates a position of the user device 128 relative to the detected object. In some implementations, the detected object is a visually identifiable aspect of the conference room 108, such as artwork, a whiteboard, a door, a window, a light switch, a light fixture, an HVAC vent cover, and so forth.

In some implementations the device positioning module 122 analyzes device video 138 received from multiple different user devices 128 and triangulates user device positions from different device videos 138 and/or room video 118 that depict common objects. In some implementations, the detected object comprises a face, such as a face of the user 130. In implementations where the detected object is a face, the device positioning module 122 is configured to perform facial recognition on device video 138 and/or room video 118 to identify the face and triangulate to generate device position data 206 using video data from different devices that depicts the same face.

Figure 3:
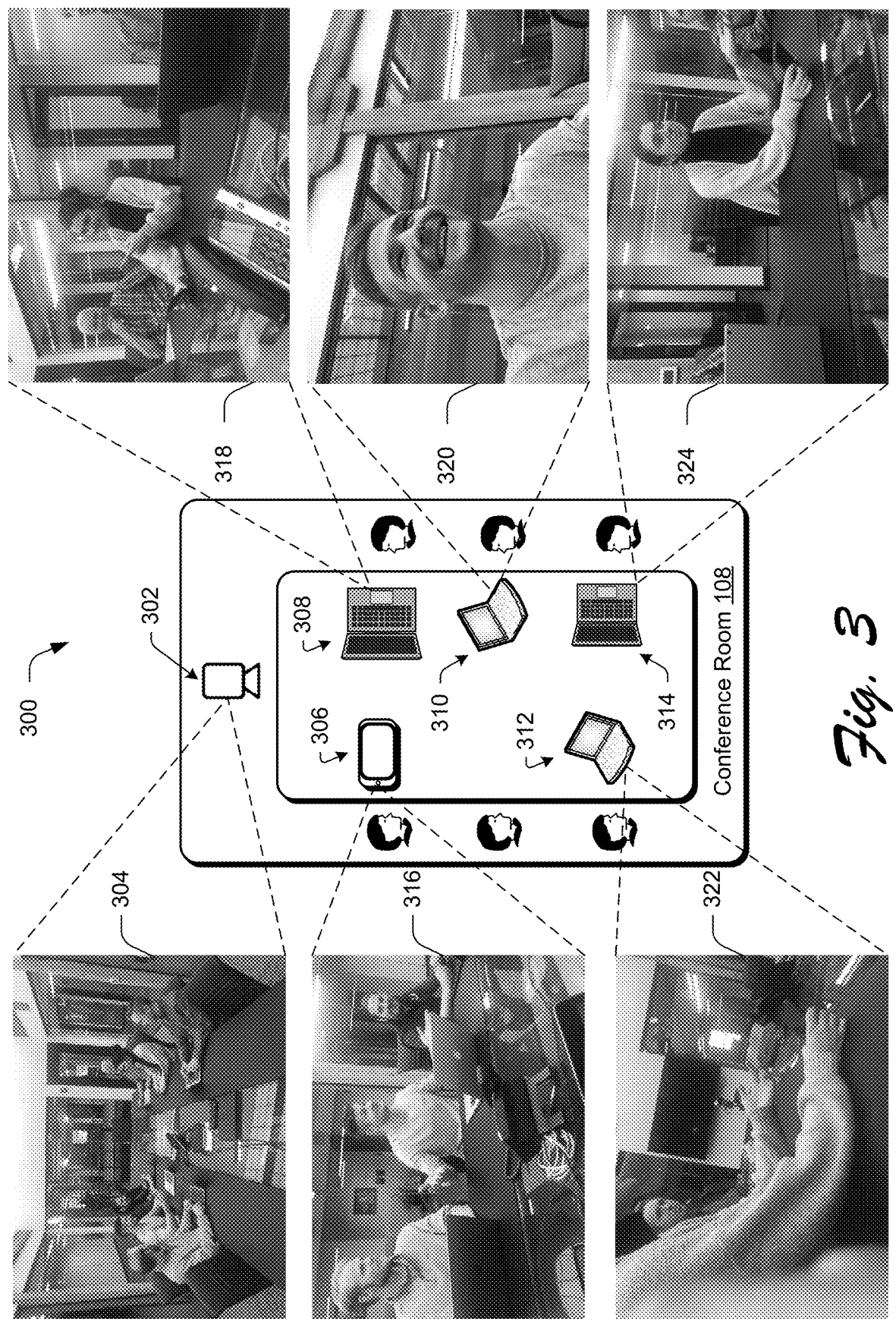
FIG. 3 depicts an example showing various viewpoints captured by user devices disposed in a room during a meeting utilized by the videoconference system of FIG. 1.

For instance, FIG. 3 depicts an example 300 the conference room 108 including a plurality of user devices 128 that are each configured to capture device video 138 useable by the videoconference system 104 for generating the conference room video 106. The device positioning module 122 is configured to determine device position data 206 for one or more of the user devices 128 depicted in the illustrated example of FIG. 3 using the techniques described herein.

In the illustrated example 300, the conference room 108 includes a camera 302, which is representative of an instance of the dedicated room camera 112 configured to capture room video 304. As depicted in the illustrated example, the room video 304 depicts a view of a conference room from a viewpoint of the camera 302, which shows six people sitting at a table with three people sitting one side of the table facing three people sitting on an opposite side of the table. Based on the orientation of the camera 302 relative to the table, each of the six people are depicted by a generally side profile view in the room video 304.

The conference room 108 is further depicted as including user device 306, user device 308, user device 310, user device 312, and user device 314, which are each representative of a user device 128 identified by the device identification module 120. The user devices 306, 308, 310, 312, and 314 are thus each configured to capture respective instances of the device video 138 and transmit the device video 138 to the videoconference system 104. For instance, user device 306 captures device video 316, user device 308 captures device video 318, user device 310 captures device video 320, user device 312 captures device video 322, and user device 314 captures device video 324. As shown in the illustrated example 300, the respective instances of the device video 138 captured by the user devices 306, 308, 310, 312, and 314 each depict different viewpoints of the conference room 108, which are utilized by the videoconference system 104 to generate the conference room video 106 as described in further detail below.

The device positioning module 122 is configured to determine device position data 206 for each of the user devices 306, 308, 310, 312, and 314 using one or more of the techniques described above. For instance, in one or more implementations the device positioning module 122 causes each of the user devices 306, 308, 310, 312, and 314 to output an audio signal via a respective signal of the user device. In some implementations, the audio signals output by each of the user devices 306, 308, 310, 312, and 314 are distinct from one another, such that different user devices output different audio signals.

The device positioning module 122 is configured to transmit instructions via pairing data 126 to each of the user devices 306, 308, 310, 312, and 314 that causes the user device to output an audio signal as well as capture device audio 136 and return the captured device audio 136 to the videoconference system 104. The device positioning module 122 is then configured to determine a respective direction and distance of each of the user devices 306, 308, 310, 312, and 314, relative to one another, by triangulation using the device audio 136 received from the user devices 306, 308, 310, 312, and 314.

Alternatively or additionally, the device positioning module 122 is configured to determine device position data 206 for one or more of the user devices 306, 308, 310, 312, and 314 by transmitting pairing data 142 that causes each of the user devices 306, 308, 310, 312, and 314 to broadcast proximity data, such as a Bluetooth, Wi-Fi, NFC, or other signal detectable by other ones of the user devices 306, 308, 310, 312, and 314. The pairing data 142 further causes the user devices 306, 308, 310, 312, and 314 to detect other proximity data being broadcast based on the instructions, estimate a distance from the device to each proximity signal, and transmit data to the videoconference system 104 indicating the estimated distance from the device to each other device detected as broadcasting proximity data. Alternatively or additionally, the device positioning module 122 is configured to include instructions in the pairing data 126 that causes each of the user devices 306, 308, 310, 312, and 314 to transmit geolocation information for the user device (e.g., GPS positioning, cellular positioning, Wi-Fi positioning, or other positioning data) to the videoconference system 104, which is used by the device positioning module 122 to generate the device position data 206 for the respective user device.

Alternatively or additionally, the device positioning module 122 is configured to generate the device position data 206 by analyzing visual data captured by the one of the user devices 306, 308, 310, 312, and 314. For example, the device positioning module 122 is configured to analyze device video 316, device video 318, device video 320, device video 322, and device video 324 and perform visual object recognition to determine whether the respective device video streams depict common objects as included in one or more of the room information 204 or other device video streams (e.g., other device video 138 or room video 118). In response to detecting common objects, the device positioning module is configured to triangulate to generate device position data 206 for one or more of the user devices 306, 308, 310, 312, and 314.

Returning to FIG. 2, after determining the device position data 206 for each user device 128 detected by the device identification module 120, the device positioning module 122 transmits the device audio 136 and device video 138 for each user device identifier 202 along with device position data 206 for the corresponding user device to the video selection module 124. The video selection module 124 is configured to detect an active speaker within the conference room 108 and generate a detailed view of the active speaker for output as the conference room video 106.

To do so, the video selection module 124 employs a speaker detection component 208 that is configured to output speaker position data 210 indicating an estimated position of the active speaker within the conference room. The speaker detection component 208 is configured to generate the speaker position data 210 using the device position data 206 and one or more of the room audio 116, the room video 118, the device audio 136, or the device video 138. In some implementations, the speaker detection component 208 determines speaker position data 210 by analyzing the room audio 116 and the device audio 136 to detect when a user is speaking in the conference room 108.

To distinguish between audio that captures a user speaking in the conference room 108 from audio of another user participating in the videoconference but not located in the conference room 108, the speaker detection component 208 is configured to filter the room audio 116 and the device audio 136 using audio output by the speaker 114. By filtering the room audio 116 and the device audio 136, the speaker detection component 208 is configured to avoid considering audio generated from a location outside the conference room 108 in generating the speaker position data 210.

Using the respective positions of devices in the conference room (e.g., positions of the microphone 110, the camera 112, and the speaker 114 as indicated in the room information 204 and positions of the user devices 128 as indicated in the device position data 206), the speaker detection component 208 is configured to analyze the respective streams of room audio 116 and device audio 136 using voice activity detection to determine whether the analyzed audio includes human speech.

In response to determining that the analyzed audio includes human speech, the speaker detection component 208 is configured to identify a portion of the each audio source (e.g., the room audio 116 or the device audio 136) corresponding to the human speech. The identified portion of the audio source is then used to determine a respective direction and distance of the device from which the audio source was received (e.g., the microphone 110 or the user device 128) and the active speaker. In some implementations, the respective direction and distance between devices and an active speaker is performed by triangulating the room audio 116 and the device audio 136 using known techniques such as TDOA, SRP, and the like.

Alternatively or additionally, the speaker detection component 208 is configured to analyze at least one of room video 118 or device video 138 using mouth movement detection to determine whether the analyzed video depicts an active speaker. For instance, the speaker detection component 208 performs lip movement recognition using known techniques on the room video 118 and the device video 138 to identify an active speaker based on changes in facial biometric features of mouth regions of human faces depicted in the video. In some implementations, the mouth movement detection is compared with the human speech detected in the respective streams of room audio 116 and device audio 136 to confirm whether detected mouth movement correlates to active human speech in the conference room 108. In implementations where the speaker detection component 208 identifies multiple sources of video content depicting an active speaker, the speaker detection component 208 is configured to triangulate a location of the active speaker using known image analysis or image processing techniques based on the room information 204 and/or corresponding location information for the device that captured the video content (e.g., the device position data 206).

In this manner, by leveraging the room audio 116, the room video 118, the device audio 136, the device video 138, the room information 204, the device position data 206, or combinations thereof, the speaker detection component 208 is configured to ascertain the location of an active speaker within the conference room 108 during a videoconference. This location of the active speaker is constantly updated, such that the speaker position data 210 describes the current position of an active speaker during the videoconference.

Upon detecting an active speaker in the conference room 108, the speaker detection component 208 communicates the speaker position data 210 to a view selection component 212. The view selection component 212 is representative of functionality of the video selection module 124 to identify video content (e.g., the room video 118 or one of the device videos 138) that best depicts the active speaker. The identified video content that best depicts the active speaker is identified and output as selected device video 214.

The view selection component 212 is configured to identify the selected device video 214 based on a variety of considerations. In some implementations, the view selection component 212 identifies the selected device video 214 based on a consideration of whether a field of view of a camera that captures video content (e.g., the room video 118 or the device video 138) includes the active speaker as specified by the speaker position data 210. Alternatively or additionally, the view selection component 212 identifies the selected device video 214 based on a distance from a camera that captures the video content to the active speaker as specified by the speaker position data 210.

Alternatively or additionally, the view selection component 212 identifies the selected device video 214 based on a visual quality of the video content. Alternatively or additionally, the view selection component 212 identifies the selected device video 214 based on an amount of a face of the active speaker depicted in the video content. Alternatively or additionally, the view selection component 212 identifies the selected device video 214 based on a reliability metric associated with the device capturing the video content (e.g., the camera 112 or the user device 128). For a further description of how the view selection component 212 identifies the selected device video 214, consider FIGS. 4-9

Figure 4:
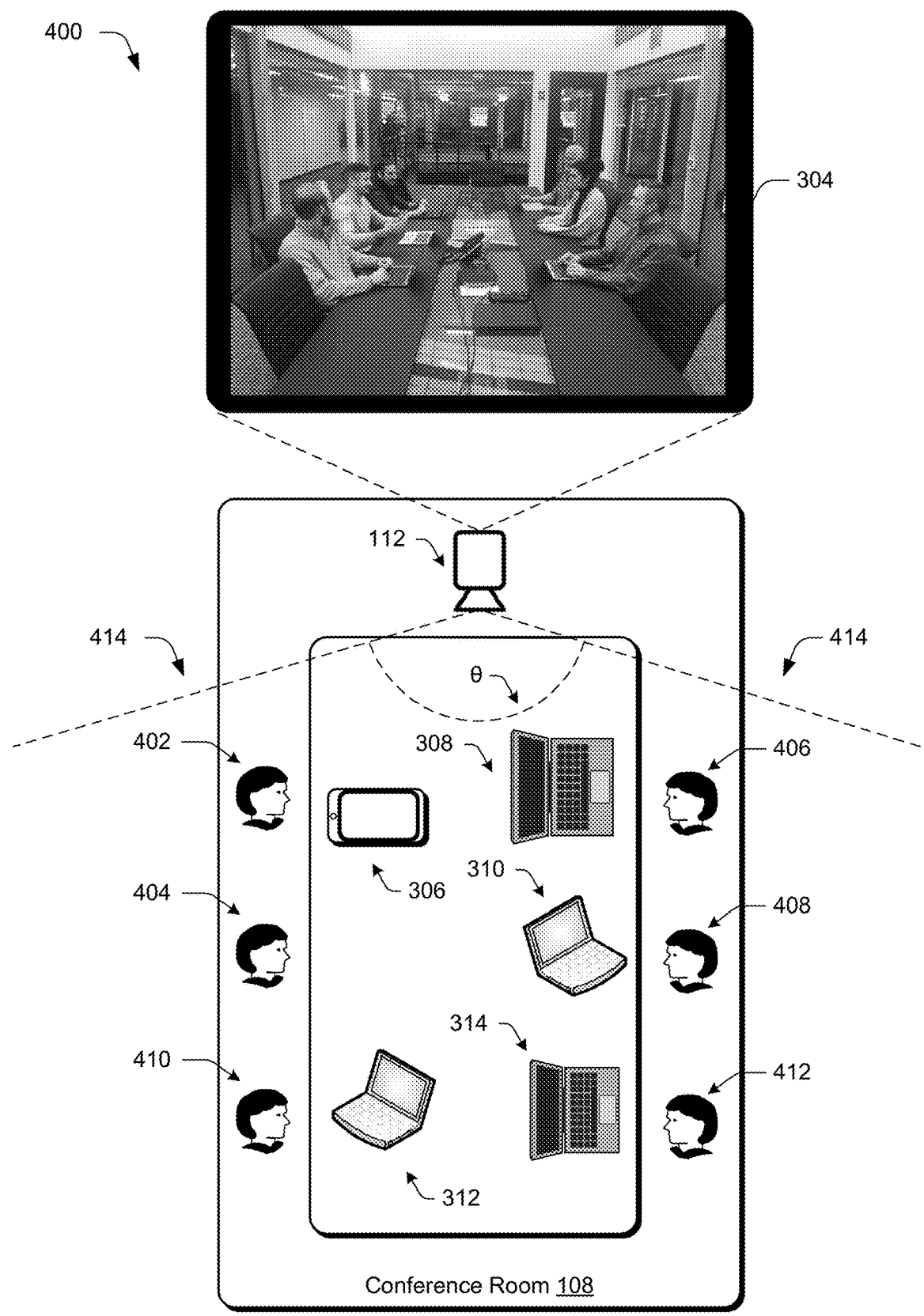
FIG. 4 depicts an example implementation showing a viewpoint captured by a meeting room camera.

FIG. 4 depicts an example 400 that illustrates an example implementation of the room video 304 captured by the camera 112 in greater detail. As shown in the illustrated example 400, the room video 304 depicts a viewpoint of the conference room 108 from the perspective of the camera 112. Specifically, the viewpoint of the room video 304 depicts the user devices 306, 308, 310, 312, and 314 along with a plurality of users participating in a videoconference, such as user 402, user 404, user 406, user 408, user 410, and user 412. Each of the user devices 306, 308, 310, 312, and 314 are represent example instances of the user device 128 and each of the users 402, 404, 406, 408, 410, and 412 represent example instances of the user 130.

In this mariner, the illustrated example of FIG. 4 is representative of an instance where user 402 brings user device 306, user 406 brings user device 308, user 408 brings user device 310, user 410 brings user device 312, and user 412 brings user device 314 into the conference room 108 during a videoconference. The illustrated example 400 additionally depicts an instance where user 404 does not bring a user device 128 into the conference room 108 or opts-out of transmitting data to the videoconference system 104 for use in generating the conference room video 106.

Boundaries for the viewpoint captured by room video 304 are represented by the dashed lines 414, such that a field of view for the camera 112 spans an angle represented by θ. While the viewpoint of room video 304 provides a comprehensive view of the conference room 108, each of the users are depicted in generally a side profile view, with limited facial features visible to a user observing the room video 304. For instance, in the illustrated example of FIG. 4, user 406 is facing away from the camera, making it impossible for a user observing room video 304 to discern mouth movement, facial expressions, and other important body language of the user 406. Users 402, 404, 408, 410, and 412 are displayed with additional facial features visible relative to user 406, but generally via side profiles with only limited facial characteristics (e.g., only one eye, part of a mouth, and so forth). Consequently, for users participating in a videoconference that are not physically located in the conference room 108, the room video 304 provides a sub-optimal viewpoint for observing a detailed view of an active speaker physically located in the conference room 108.

FIG. 5 depicts an example 500 that illustrates an example implementation of the device video 316 captured by user device 306 in greater detail. As shown in the illustrated example 500, the device video 316 depicts a viewpoint of the conference room 108 from the perspective of a camera 132 of the user device 306. Boundaries for the viewpoint captured by the user device 306 are represented by the dashed lines 502, such that a field of view for the user device 306 spans an angle between the dashed lines 502. The viewpoint captured by device video 316 depicts users 406, 408, and 412, but does not depict users 402, 404, or 410.

Figure 6:
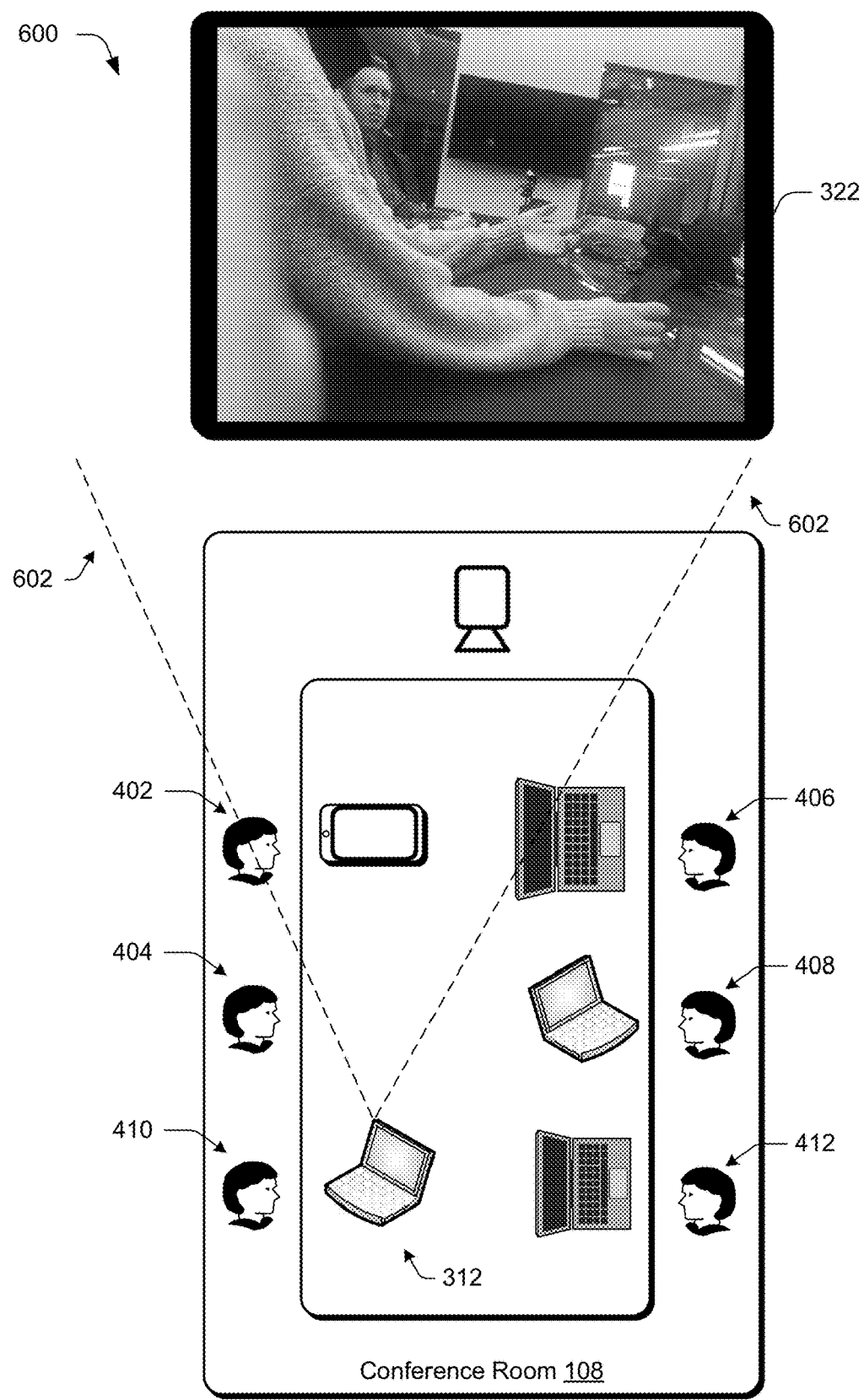

FIG. 6 depicts an example 600 that illustrates an example implementation of the device video 322 captured by user device 312 in greater detail. As shown in the illustrated example 600, the device video 322 depicts a viewpoint of the conference room 108 from the perspective of a camera 132 of the user device 312. Boundaries for the viewpoint captured by the user device 312 are represented by the dashed lines 602, such that a field of view for the user device 312 spans an angle between the dashed lines 602. The viewpoint captured by device video 322 depicts user 402, visually occluded by user 404, and does not depict users 406, 408, 410, or 412.

FIG. 7 depicts an example 700 that illustrates an example implementation of the device video 318 captured by user device 308 in greater detail. As shown in the illustrated example 700, the device video 318 depicts a viewpoint of the conference room 108 from the perspective of a camera 132 of the user device 308. Boundaries for the viewpoint captured by the user device 308 are represented by the dashed lines 702, such that a field of view for the user device 308 spans an angle between the dashed lines 702. The viewpoint captured by device video 318 depicts users 404 and 410, along with a portion of user 402, and does not depict users 406, 408, or 412.

FIG. 8 depicts an example 800 that illustrates an example implementation of the device video 320 captured by user device 310 in greater detail. As shown in the illustrated example 800, the device video 320 depicts a viewpoint of the conference room 108 from the perspective of a camera 132 of the user device 310. Boundaries for the viewpoint captured by the user device 310 are represented by the dashed lines 802, such that a field of view for the user device 310 spans an angle between the dashed lines 802. The viewpoint captured by device video 320 depicts only user 408, and does not depict users 402, 404, 406, 410, or 412.

FIG. 9 depicts an example 900 that illustrates an example implementation of the device video 324 captured by user device 314 in greater detail. As shown in the illustrated example 900, the device video 324 depicts a viewpoint of the conference room 108 from the perspective of a camera 132 of the user device 314. Boundaries for the viewpoint captured by the user device 314 are represented by the dashed lines 902, such that a field of view for the user device 314 spans an angle between the dashed lines. The viewpoint captured by the device video 324 depicts user 404, portions of users 402 and 410, and does not depict users 406, 408, and 412.

In an example implementation where the speaker position data 210 indicates that the position of an active speaker in the conference room 108 corresponds to a location at which user 408 is depicted in the illustrated examples of FIGS. 4-9, the view selection component 212 is configured to analyze the room video 304, device video 316, device video 318, device video 320, device video 322, and device video 324 to determine which of the videos should be output as the selected device video 214. In accordance with one or more implementations, the view selection component 212 determines whether each of the room video 304, device video 316, device video 318, device video 320, device video 322, and device video 324 are associated with a field of view that includes the position indicated by the speaker position data 210 (e.g., the position of user 408). As depicted in FIGS. 4-9, this consideration limits candidates for the selected device video 214 to room video 304, device video 316, and device video 320.

Alternatively or additionally, the view selection component 212 selects a video for output as the selected device video 214 based on a distance from a camera that captures the video content to the active speaker as specified by the speaker position data 210. Continuing the previous example where user 408 is the active speaker, the view selection component 212 determines whether to use the room video 304, the device video 316, or the device video 320 as the selected device video 214 based on respective distances between the location of the user 408 and the device that captured the respective video. To do so, the view selection component 212 compares a distance between the speaker position data 210 and the device position data 206 for the camera 112, the user device 306, and the user device 310 that captured the room video 304, device video 316, and device video 320, respectively. In such an implementation, the view selection component 212 selects the device video 320 for output as the selected device video 214 responsive to determining that the user device 310 captures the user 408 in device video 320 and has a closest proximity to the speaker position data 210 relative to other devices that capture the user 408 in their respective field of view.

Alternatively or additionally, the view selection component 212 identifies the selected device video 214 based on a visual quality associated with video content that captures an active speaker within its field of view. For instance, the view selection component 212 is configured to analyze metadata associated with video received by the videoconference system 104 to determine a visual quality of the video content. As an example, the view selection component 212 determines a visual quality of video content based on lighting conditions specified in video metadata, such as video ISO level, color depth values, brightness levels, and so forth. The view selection component 212 is configured to assess the visual quality of a video using known video quality assessment techniques, such as FFmpeg, Open VQ, and the like. In an example implementation, the view selection component 212 selects the device video 316 for output as the selected device video 214 depicting a detailed view of the user 408 instead of the device video 320 due to the device video 316 having an improved visual quality relative to the device video 320, despite the device video 320 being captured by a device closer in proximity to the speaker position data 210.

Alternatively or additionally, the view selection component 212 identifies the selected device video 214 based on an amount of a face of the active speaker depicted in the video content. For instance, the view selection component 212 is configured to analyze video that captures an active speaker within its field of view using known facial recognition techniques, such as by implementing a machine learning model trained to identify human faces and specific facial features thereof (e.g., eyes, nose, ear, mouth, cheek, chin, forehead, etc.) in video content. The view selection component 212 is configured to analyze whether a video includes a face of an active speaker. In some implementations, determining whether a video includes an active speaker's face is performed by detecting whether lip movement in a video corresponds to one or more of the room audio 116 or the device audio 136 captured within the conference room 108. The view selection component 212 is configured to prioritize videos that depict additional facial features of an active speaker for output as the selected device video 214 over videos that depict fewer facial features of the active speaker. For instance, the view selection component 212 selects a viewpoint that depicts two eyes, a nose, and a mouth of an active speaker over a viewpoint that depicts one ear, one eye, and the mouth of the active speaker. As an example, consider an implementation where the speaker position data 210 indicates that user 406 is an active speaker during a videoconference. In this example implementation, the view selection component 212 identifies room video 304 and device video 316 as candidates for output as the selected device video 214 due to including user 406 in their respective fields of view. The view selection component 212 is configured to designate the device video 316 as the selected device video 214 in response to determining that the device video 316 depicts additional facial features of the user 406 relative to room video 304, thus providing an improved viewpoint for the active speaker for videoconference participants not physically located in the conference room 108.

In some implementations, the view selection component 212 is configured to assign a reliability metric to each user device 128 and output the selected device video 214 based on the reliability metrics. For instance, in some implementations the reliability metric is a value representative of a distance of an active speaker as indicated by the speaker position data 210 to a center of a field of view for the user device 128. In such implementations, the value of the reliability metric is weighted to favor devices that capture the position of an active speaker in a center of the field of view and disfavor devices that capture the position of an active speaker near boundaries of the device's field of view. In this mariner, the reliability metric is indicative of a probability of whether the device's field of view will capture a position of a user 130, accounting for user movement during the videoconference.

Alternatively or additionally, the reliability metric is a value representing a portion of time in which a user's facial features are in a field of view. Alternatively or additionally, the reliability metric is a value representing a portion of time in which a user is facing forward (e.g., when two eyes, a nose, and a mouth are visible) in the field of view. Alternatively or additionally, the reliability metric is a value indicating a ratio of a face depicted relative to a device's field of view (e.g., a percentage value indicating how much of a field of view is occupied by a face). In such implementations, the reliability metric is useable to prioritize fields of view depicting 15% to 50% of a field of view relative to fields of view depicting a face that occupies other percentages of fields of view.

Alternatively or additionally, the reliability metric is a value representative of an amount of movement associated with the user device 128 during the videoconference. For instance, the view selection component 212 is configured to analyze device video 138 received from a user device 128 and determine whether the user device 128 moves during capture of the device video 138 (e.g., whether the user device 128 is repositioned by a user 130 within the conference room 108 during a videoconference). In such implementations, the value of the reliability metric is weighted to favor devices that remain motionless during the videoconference and disfavor devices having detected motion during the videoconference. Alternatively or additionally, the value of the reliability metric is weighted to favor devices having a lower face to frame ratio (e.g., wider frame shots) to compensate for movement while still depicting an active speaker face.

In this mariner, the reliability metric is indicative of whether the field of view being captured by the user device 128 will persist during the videoconference. As part of monitoring the device video 138 for motion of a user device 128, the view selection component 212 is configured to transmit an indication of device motion to the device positioning module 122 in response to detecting motion, which causes the device positioning module 122 to update device position data 206 for the corresponding user device 128.

Alternatively or additionally, the reliability metric is a value representative of a user device 128 network connection quality. For instance, the view selection component 212 is configured to ascertain information describing a connection between a user device 128 and a network that connects the user device 128 to the videoconference system 104 (e.g., network 144). In such implementations, the value of the reliability metric is weighted to favor devices having strong network connections (e.g., high bandwidth connections to the network 144) and disfavor devices having weaker network connections during the videoconference. In this manner, the reliability metric is indicative of whether the user device 128 is likely to maintain a connection with the videoconference system 104 and transmit device audio 136 and/or device video 138 in an acceptable quality for output as part of the conference room video 106. Alternatively or additionally, the reliability metric is indicative of a visual quality of image data captured by a device, such as resolution, exposure, Highlight or lowlights, white balance, and so forth.

Figure 10:
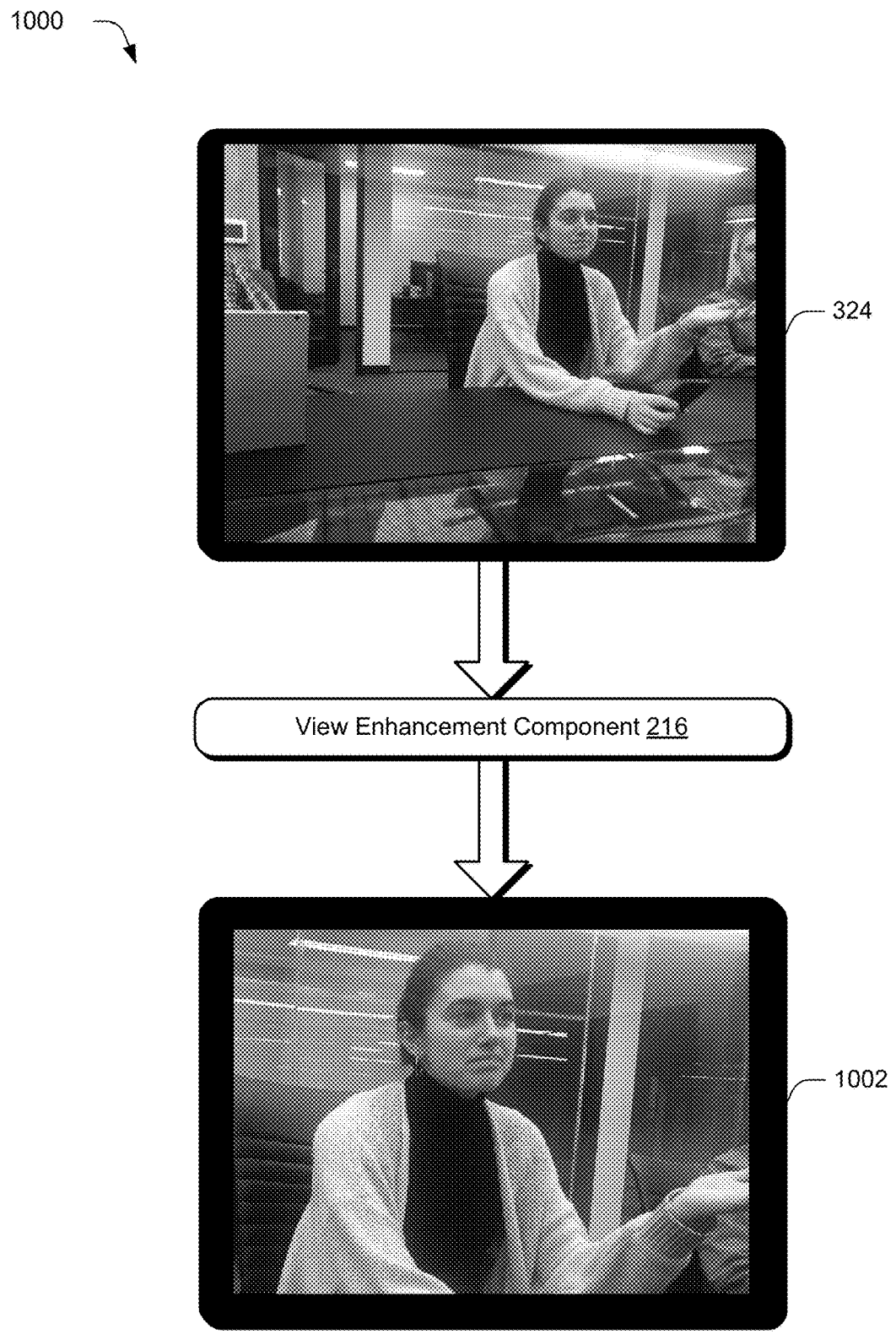
FIG. 10 depicts an example implementation of the videoconference system of FIG. 1 generating a personalized viewpoint from at least one viewpoint captured by a user device disposed in a meeting room.

Upon identifying the room video 118 or device video 138 to be output as the selected device video 214, the view selection component 212 transmits the selected device video 214 to a view enhancement component 216. The view enhancement component 216 is representative of functionality of the video selection module 124 to further process the selected device video 214 to enhance a viewpoint depicting an active speaker for output as part of the conference room video 106. For instance, FIG. 10 depicts an example 1000 of the view enhancement component 216 generating an enhanced view 1002 of the device video 324 for output as the conference room video 106. The illustrated example 1000 thus depicts an example implementation where the user 404 is identified as an active speaker by the speaker position data 210 and the device video 324 is identified by the view selection component 212 as the selected device video 214 for output as the conference room video 106.

The view enhancement component 216 is configured to generate the enhanced view 1002 by processing the device video 324 to provide a detailed viewpoint of the user 404. As part of processing the selected device video 214 to provide a detailed viewpoint that depicts an active speaker in a videoconference, the view enhancement component 216 is configured to implement any suitable type of image processing technique. For instance, the view enhancement component 216 is configured to perform at least one of cropping, zooming, rotating, smoothing, resolution scaling, frame rate adjusting, aspect ratio modifying, contrast adjusting, brightness adjusting, saturation adjusting, stabilizing, and so forth as part of generating the enhanced view 1002. As another example, the view enhancement component 216 is configured to modify the room video 304 captured by the camera 112 when outputting the room video 304 as the conference room video 106, such as by adjusting a focus of the camera 112 to a location of the conference room 108 that corresponds to the speaker position data 210.

The selected device video 214, optionally processed by the view enhancement component 216, is then output as the conference room video 106. The videoconference system 104 is configured to output the conference room video 106 during a videoconference by broadcasting the conference room video 106, either as a replacement to or supplementing the room video 304, to at least one other computing device participating in the videoconference with the conference room 108. In this manner, the conference room video 106 output by the videoconference system 104 provides videoconference participants not physically located in the conference room 108 with an improved viewpoint of one or more videoconference participants located in the conference room 108, thus enhancing an overall experience for videoconference participants.

Having considered example systems and techniques for generating a conference room video that depicts a personalized viewpoint of at least one videoconference participant located in a conference room, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-10.

Figure 11:
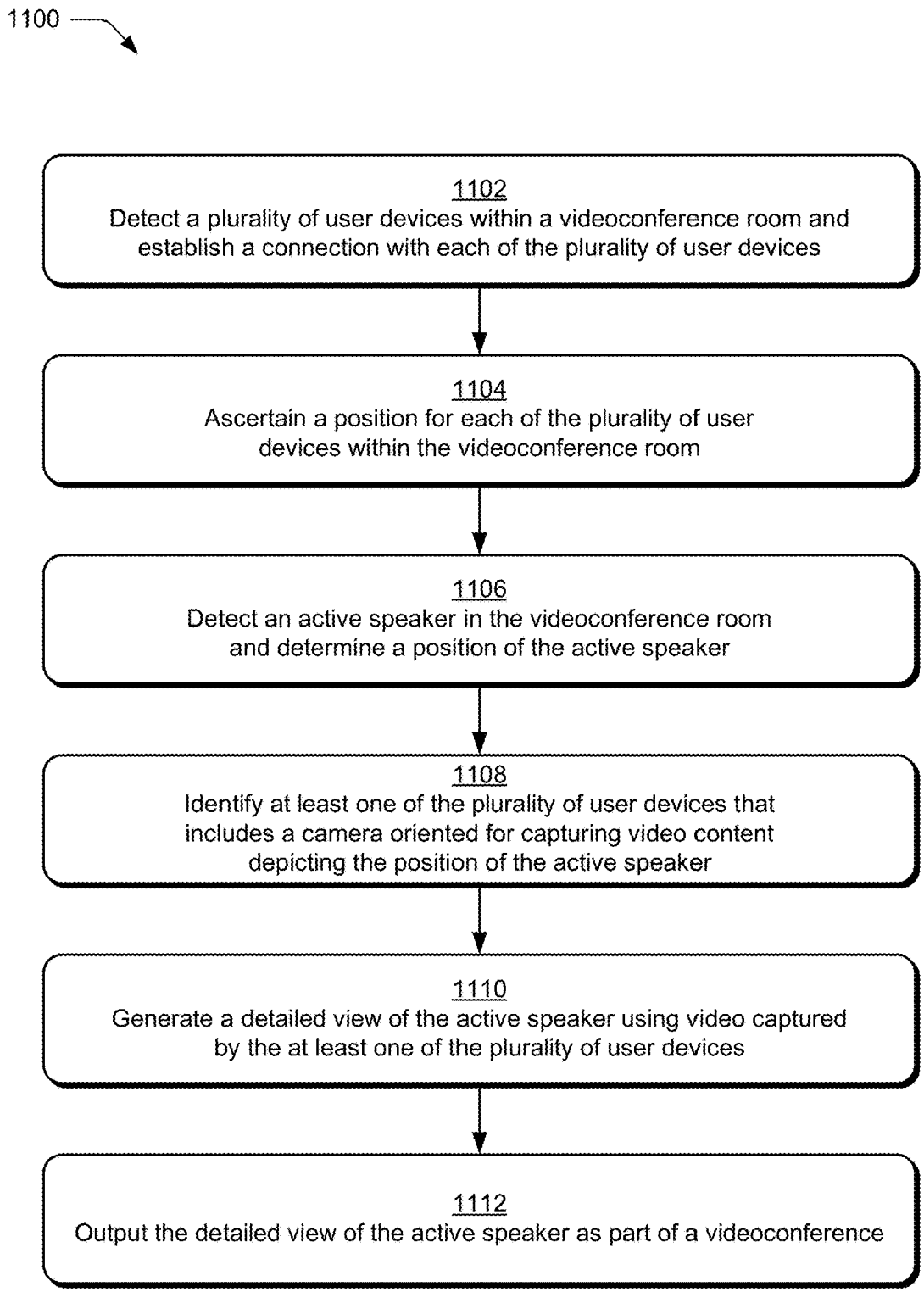
FIG. 11 is a flow diagram depicting a procedure in an example implementation in which a videoconference system generates a personalized viewpoint of an active speaker in a meeting room using a viewpoint captured by a user device disposed in the meeting room.

FIG. 11 depicts a procedure 1100 in an example implementation of generating a conference room video that depicts a detailed viewpoint of an active speaker in accordance with the techniques described herein. To begin, a plurality of user devices are detected within a videoconference room and a connection is established with each of the plurality of user devices (block 1102). The device identification module 120, for instance, transmits pairing data 126 for output by the speaker 114 of the conference room 108, which includes an audible signal encoding instructions that, upon detection by a microphone 134 of a user device 128, causes the user device 128 to establish a connection with the videoconference system 104. In response to establishing a connection with the user device 128, the videoconference system 104 transmits an opt-in prompt 140 to the user device 128 requesting consent from a user 130 of the user device 128 to transmit device audio 136 and/or device video 138 to the videoconference system 104 for use in generating the conference room video 106.

In some implementations, upon establishing a connection with the user device 128 and receiving consent from the user 130 of the user device 128, the device identification module 120 leverages the user device 128 for detecting other user devices located in the conference room 108. For instance, the device identification module 120 transmits pairing data 142 to the user device 128 including instructions that cause the user device 128 to detect one or more additional user devices and direct the one or more additional user devices to establish a connection with the videoconference system 104.

A position for each of the plurality of user devices within the videoconference room is then ascertained (block 1104). The device positioning module 122, for instance, determines device position data 206 for each of a plurality of user device identifiers 202, where each user device identifier 202 corresponds to one of the user devices 128 from which device audio 136 and/or device video 138 is received. In some implementations, the device positioning module 122 determines the device position data 206 using room information 204 for the conference room 108. Alternatively or additionally, the device positioning module 122 determines the device position data 206 for each user device 128 detected in the conference room 108 using one or more of the room audio 116, the room video 118, the device audio 136, or the device video 138.

An active speaker in the videoconference room is detected and a position of the active speaker is determined (block 1106). The speaker detection component 208, for instance, analyzes at least one of the room audio 116 or the device audio 136 and detects that an active speaker is located in the conference room 108. In response to detecting the active speaker in the conference room 108, the speaker detection component 208 determines speaker position data 210, which indicates the position of the active speaker in the conference room 108. The speaker detection component 208 is configured to generate the speaker position data 210 using the device position data 206 and one or more of the room audio 116, the room video 118, the device audio 136, or the device video 138.

At least one of the plurality of user devices is identified as including a camera oriented for capturing video content depicting the position of the active speaker (block 1108). For instance, in an example implementation where the speaker position data 210 indicates a position corresponding to user 404, suggesting that user 404 is the active speaker during a videoconference, the view selection component 212 identifies devices in the conference room 108 that capture video content including the user 404 in their respective field of view. For instance, the view selection component 212 identifies that the room video 304 captured by camera 302, the device video 318 captured by user device 308 and the device video 324 captured by user device 314 depict the user 404.

A detailed view of the active speaker is generated using video captured by the at least one of the plurality of user devices (block 1110). The view selection component 212, for instance, determines which of the potential candidate videos room video 304, device video 318, or device video 324 to output as the selected device video 214 depicting a detailed view of the active speaker user 404. In some implementations, the view selection component 212 identifies the selected device video 214 based on a distance from a camera that captures the video content to the active speaker as specified by the speaker position data 210. Alternatively or additionally, the view selection component 212 identifies the selected device video 214 based on a visual quality of the video content. Alternatively or additionally, the view selection component 212 identifies the selected device video 214 based on an amount of a face of the active speaker depicted in the video content. Alternatively or additionally, the view selection component 212 identifies the selected device video 214 based on a reliability metric associated with the device capturing the video content.

The detailed view of the active speaker is then output as part of a videoconference (block 1112). The view enhancement component 216, for instance, outputs the selected device video 214 as the conference room video 106. In some implementations, the view enhancement component 216 is configured to process the selected device video 214 prior to outputting the conference room video 106. For instance, the view enhancement component 216 is configured to generate the enhanced view 1002 by processing the device video 324 to provide a detailed viewpoint of the user 404. In some implementations, the view enhancement component 216 generates the enhanced view 1002 using one or more image processing techniques, such as cropping, zooming, rotating, smoothing, resolution scaling, frame rate adjusting, aspect ratio modifying, contrast adjusting, brightness adjusting, saturation adjusting, stabilizing, and so forth.

The videoconference system 104 is configured to output the conference room video 106 during a videoconference by broadcasting the conference room video 106, either as a replacement to or supplementing the room video 304, to at least one other computing device participating in the videoconference with the conference room 108, thus enhancing an overall experience for videoconference participants.

Having described example procedures in accordance with one or more implementations, consider now an example system and device to implement the various techniques described herein.

Example System and Device

Figure 12:
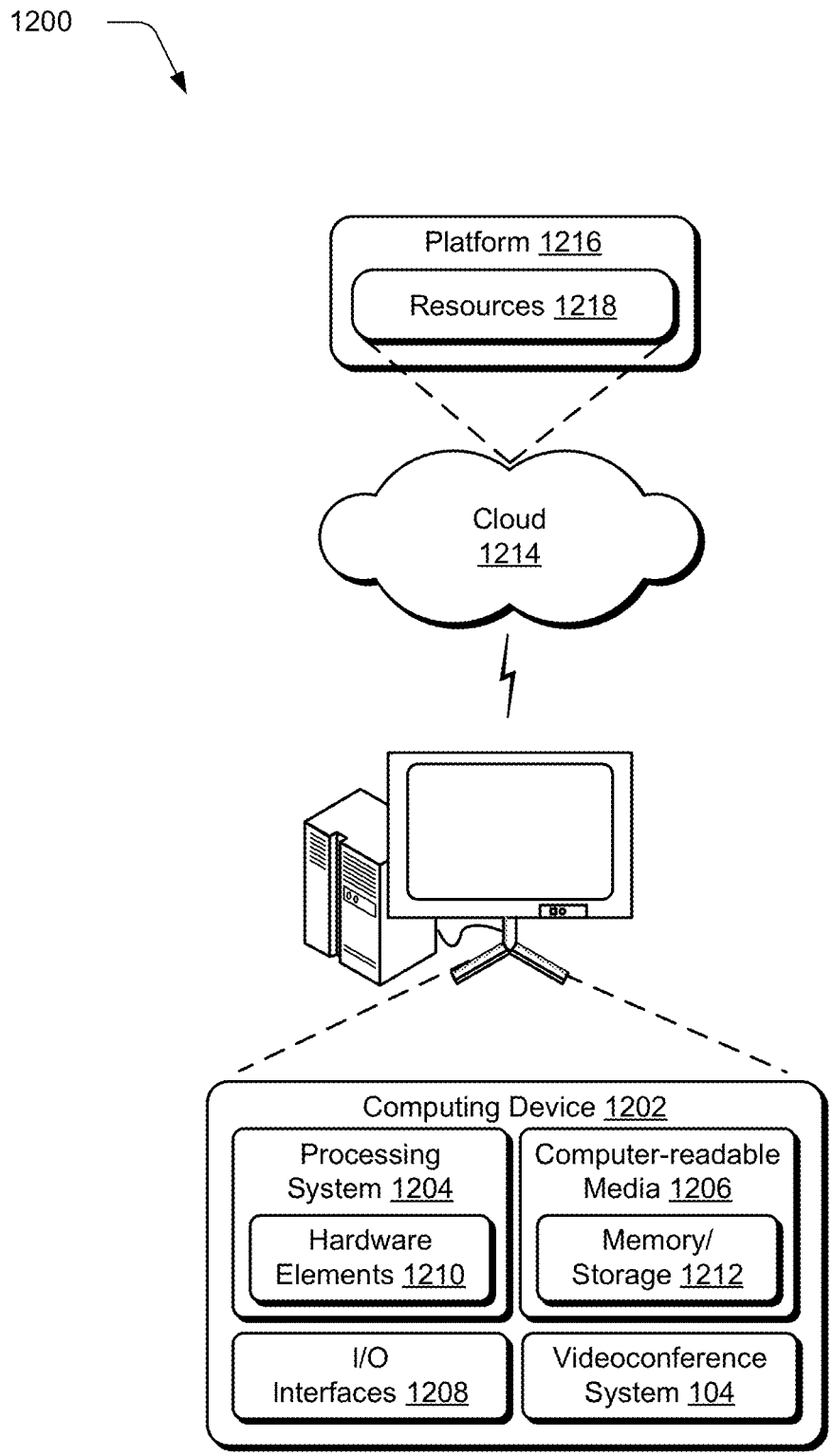
FIG. 12 illustrates an example system including various components of an example device to implement the techniques described with reference to FIGS. 1-11.

FIG. 12 illustrates an example system 1200 that includes an example computing device 1202, which is representative of one or more computing systems and/or devices that implement the various techniques described herein. This is illustrated through inclusion of the videoconference system 104. The computing device 1202 is configured, for example, as a service provider server, as a device associated with a client (e.g., a client device), as an on-chip system, and/or as any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that are configurable as processors, functional blocks, and so forth. For instance, hardware element 1210 is implemented in hardware as an application specific integrated circuit or other logic device formed using one or more semiconductors. The hardware elements 1210 are not limited by the materials from which they are formed or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 1206 is illustrated as including memory/storage 1212. The memory/storage 1212 represents memory/storage capacity associated with one or more computer-readable media. The memory/storage 1212 is representative of volatile media (such as random-access memory (RAM)) and/or nonvolatile media (such as read only memory (ROM), Flash memory, optical disks, magnetic disks, and so forth). The memory/storage 1212 is configured to include fixed media (e.g., RAM, ROM, a fixed hard drive, and so on) as well as removable media (e.g., Flash memory, a removable hard drive, an optical disc, and so forth). In certain implementations, the computer-readable media 1206 is configured in a variety of other ways as further described below.

Input/output interface(s) 1208 are representative of functionality to allow a user to enter commands and information to computing device 1202, and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 1202, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is further configured to be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that is utilized while computer processing is executed on servers that are remote from the computing device 1202. Resources 1218 also include services provided over the Internet and/or through a subscriber network, such as a cellular or Wi-Fi network.

The platform 1216 is configured to abstract resources and functions to connect the computing device 1202 with other computing devices. The platform 1216 is further configured to abstract scaling of resources to provide a corresponding level of scale to encountered demand for the resources 1218 that are implemented via the platform 1216. Accordingly, in an interconnected device embodiment, implementation of functionality described herein is configured for distribution throughout the system 1200. For example, in some configurations the functionality is implemented in part on the computing device 1202 as well as via the platform 1216 that abstracts the functionality of the cloud 1214.

CONCLUSION

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method comprising:
   detecting a plurality of user devices within a room by broadcasting an ultrasonic audio signal that causes each of the plurality of user devices to transmit a request for joining a video conference to a service provider associated with the video conference;
   ascertaining, for each of the plurality of user devices, a position of the user device within the room;
   detecting a user speaking in the room and determining a position of the user speaking in the room;
   identifying at least one of the plurality of user devices that includes a camera oriented for capturing video content that includes the position of the user speaking in the room based at least in part on approximating a distance between the at least one of the plurality of user devices and the user speaking in the room;
   generating a detailed view of the user speaking in the room using video captured by one or more of the at least one of the plurality of user devices by prioritizing video that depicts additional features of a face of the user speaking in the room over video that depicts fewer features of the face of the user speaking in the room; and
   outputting the detailed view of the user speaking in the room as part of the video conference.

2. The method of claim 1, wherein detecting one of the plurality of user devices within the room is performed by detecting, using at least one microphone included in the room, an ultrasonic frequency broadcast by the one of the plurality of user devices.

3. The method of claim 1, wherein identifying the at least one of the plurality of user devices that includes the camera oriented for capturing video content that includes the position of the user speaking in the room comprises analyzing the video content captured by the camera of the at least one of the plurality of user devices and identifying mouth movement depicted in the video content.

4. The method of claim 1, wherein ascertaining the position of each of the plurality of devices is performed by causing each of the plurality of devices to output a unique signal and triangulating the position of the device based on the unique signal.

5. The method of claim 1, wherein ascertaining the position of the user device within the room comprises obtaining video content captured by the user device and performing image analysis on the video content captured by the user device.

6. The method of claim 5, wherein performing image analysis on the video content captured by the user device comprises identifying at least one object in the room having a known position and using the known position of the at least one object to ascertain the position of the user device within the room.

7. The method of claim 5, wherein performing image analysis on the video content captured by the user device comprises triangulating video data captured by multiple ones of the plurality of user devices and determining a position of the user device relative to the multiple ones of the plurality of user devices.

8. The method of claim 1, wherein identifying at least one of the plurality of user devices that includes the camera oriented for capturing video content that includes the position of the user speaking in the room comprises performing facial recognition on video content captured by the at least one of the plurality of devices and identifying that the video content depicts a face with mouth movement.

9. The method of claim 1, further comprising assigning a reliability metric to video data captured by each of the plurality of user devices based on a distance between the user speaking in the room to a center of a field of view captured by the user device.

10. The method of claim 9, further comprising adjusting the reliability metric in response to detecting movement of the user device.

11. A computer-readable storage medium storing instructions that, when executed by a computing device, cause the computing device to perform operations comprising:
    detecting a plurality of user devices within a room by broadcasting an ultrasonic audio signal that causes each of the plurality of user devices to transmit a request for joining a video conference to a service provider associated with the video conference;
    ascertaining, for each of the plurality of user devices, a position of the user device within the room;
    detecting a user speaking in the room and determining a position of the user speaking in the room;

identifying at least one of the plurality of user devices that includes a camera oriented for capturing video content that includes the position of the user speaking in the room based at least in part on approximating a distance between the at least one of the plurality of user devices and the user speaking in the room;

generating a detailed view of the user speaking in the room using video captured by one or more of the at least one of the plurality of user devices by prioritizing video that depicts additional features of a face of the user speaking in the room over video that depicts fewer features of the face of the user speaking in the room; and outputting the detailed view of the user speaking in the room as part of the video conference.

12. The computer-readable storage medium of claim 11, wherein detecting one of the plurality of user devices within the room is performed by detecting, using at least one microphone included in the room, an ultrasonic frequency broadcast by the one of the plurality of user devices.

13. The computer-readable storage medium of claim 11, wherein identifying the at least one of the plurality of user devices that includes the camera oriented for capturing video content that includes the position of the user speaking in the room comprises analyzing the video content captured by the camera of the at least one of the plurality of user devices and identifying mouth movement depicted in the video content.

14. The computer-readable storage medium of claim 11, wherein ascertaining the position of each of the plurality of devices is performed by causing each of the plurality of devices to output a unique signal and triangulating the position of the device based on the unique signal.

15. The computer-readable storage medium of claim 14, wherein performing image analysis on the video content captured by the user device comprises identifying at least one object in the room having a known position and using the known position of the at least one object to ascertain the position of the user device within the room.

16. The computer-readable storage medium of claim 14, wherein performing image analysis on the video content captured by the user device comprises triangulating video data captured by multiple ones of the plurality of user devices and determining a position of the user device relative to the multiple ones of the plurality of user devices.

17. The computer-readable storage medium of claim 11, wherein ascertaining the position of the user device within the room comprises obtaining video content captured by the user device and performing image analysis on the video content captured by the user device.

18. A system comprising:

a camera;

a microphone;

a speaker;

one or more processors; and a computer-readable storage medium storing instructions that are executable by the one or more processors to perform operations comprising:

detecting a plurality of user devices within a room by broadcasting an ultrasonic audio signal using the speaker, the ultrasonic audio signal configured to cause each of the plurality of user devices to transmit a request for joining a video conference;

detecting a user speaking in the room using audio data captured by the microphone and determining a position of the user speaking in the room using video data captured by the camera;

identifying at least one of the plurality of user devices that includes a camera oriented for capturing video content that includes the user speaking in the room based at least in part on approximating a distance between the at least one of the plurality of user devices and the user speaking in the room;

generating a detailed view of the user speaking in the room using video captured by one or more of the at least one of the plurality of user devices by prioritizing video that depicts additional features of a face of the user speaking in the room over video that depicts fewer features of the face of the user speaking in the room; and outputting the detailed view of the user speaking in the room as part of the video conference captured using the camera.

19. The system of claim 18, the operations further comprising assigning a reliability metric to video data captured by each of the plurality of user devices based on a distance between the user speaking in the room to a center of a field of view captured by the user device.

20. The system of claim 19, further comprising adjusting the reliability metric in response to detecting movement of the user device.

* * * * *